United States Patent [19]
Picandet
[11] 3,903,509
[45] Sept. 2, 1975

[54] METHOD AND SYSTEM FOR STORING AND CYCLICALLY PROCESSING INFORMATION PROVIDED FROM A LARGE NUMBER OF INFORMATION TRANSMISSION TERMINALS

[76] Inventor: Jean Picandet, 12, rue du Docteur Paquelin, 75020 Paris, France

[22] Filed: July 18, 1973

[21] Appl. No.: 380,394

[30] Foreign Application Priority Data
July 24, 1972 France .............................. 72.26554

[52] U.S. Cl. .......................... 340/172.5; 179/18 ES
[51] Int. Cl.$^2$... G06F 7/24; G06F 7/28; G06F 7/34; G06F 15/20
[58] Field of Search .......... 179/18 ES, 18 J, 7 MM; 340/172.5

[56] References Cited
UNITED STATES PATENTS

| | | | |
|---|---|---|---|
| 3,404,237 | 10/1968 | Bartlett | 179/18 J X |
| 3,499,120 | 3/1970 | Fischer et al. | 179/18 J |
| 3,551,598 | 12/1970 | Varda | 179/7 MM X |
| 3,585,600 | 6/1971 | Saltini | 340/172.5 |
| 3,648,255 | 3/1972 | Beausoleil et al. | 340/172.5 |
| 3,668,329 | 6/1972 | Hardy et al. | 179/18 ES X |

*Primary Examiner*—Gareth D. Shaw
*Assistant Examiner*—James D. Thomas
*Attorney, Agent, or Firm*—David A. Blumenthal; Raymond A. Robic

[57] ABSTRACT

Method and system permitting the processing of two-way connections in an electronic telephone exchange. A central logical control unit C introduces the items of information relative to a connection in the form of words into a sequential access circulating store M, through a parallel register R. This register sequentially receives the words leaving M and reintroduces them into M as long as their processing by C has not been completed. An exchange of items of information between words takes place with the aid of a buffer register T and a comparator A. The method and system are applicable to all information processing systems.

2 Claims, 1 Drawing Figure

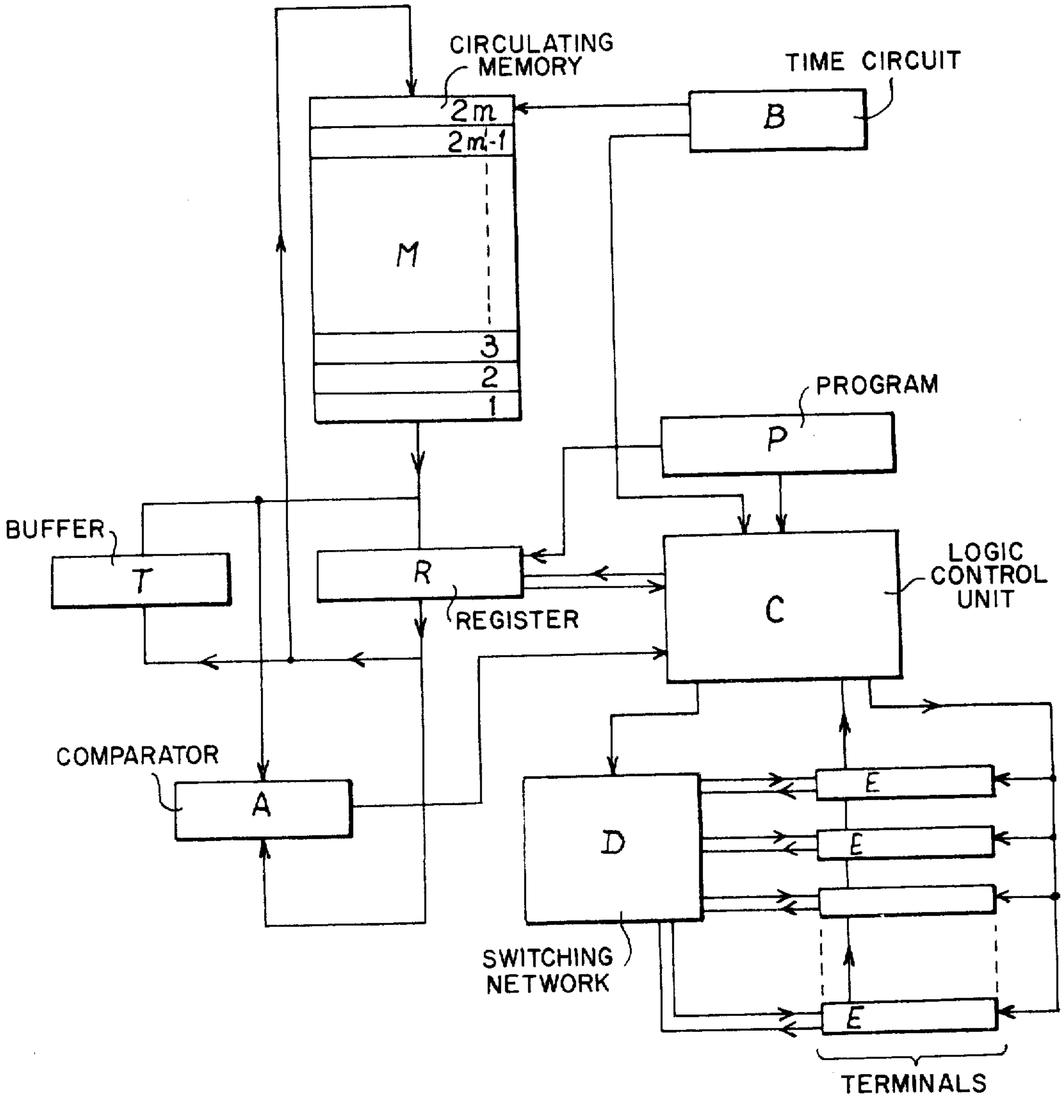
CIRCULATING MEMORY
2m
2m-1
M
3
2
1
TIME CIRCUIT
B
PROGRAM
P
BUFFER
T
R
REGISTER
LOGIC CONTROL UNIT
C
COMPARATOR
A
D
SWITCHING NETWORK
E
E
E
TERMINALS

METHOD AND SYSTEM FOR STORING AND CYCLICALLY PROCESSING INFORMATION PROVIDED FROM A LARGE NUMBER OF INFORMATION TRANSMISSION TERMINALS

FIELD OF THE INVENTION

The present invention concerns a method of and a system for processing information emanating from a considerable number of terminal information transmission equipments and formed in a central logical control unit in the form of words, each of which contains all the information relative to one particular terminal equipment.

SUMMARY OF THE INVENTION

In this method of information processing, use is made of a sequential access circulating store in which the words are stored.

This type of store is useful whenever it is desired to process sequentially a large number of items of information. This is the case with electronic telephone exchanges, in which the processing of each telephonic connection can be considered sequentially by the logical control unit.

In such an application, a word contains, for example, all the data relative to a one-way connection between two subscribers of the telephone exchange, so that any two-way connection, once established, necessitates the use of two words of the store, one for the caller and one for the called subscriber.

The data are introduced into each word in the form of binary elements or bits.

The data relative to a word are simultaneously made available to the logical central control unit.

Some information processing systems at present employed in electronic telephone exchanges generally make use of a random access store and of a central logical control unit identical to that of a computer.

However, such a store requires complex positioning operations for the processing words. Other known systems require a large number of members such as registers or delay devices, each of these members performing therein a single function for a series of telephone subscribers' stations.

The information processing system according to the invention is not attended by such disadvantages, because, owing to the fact that it comprises a sequential access circulating store, the word positioning operations are eliminated therein, whereby the processing of the information is simplified. On the other hand, the signals of the time base circuit cause the words stored in the store to appear successively in the same order in which they are positioned; finally, the various control members, such as registers, markers, time delay devices, such as shown in U.S. Pat. No. 3,668,329 etc., are not needed per se in that a single member (for example a binary counter) permits of performing the functions normally performed by the combination of the aforesaid members.

The information processing method according to the invention consists in storing the words in a sequential access circulating store and then extracting these words sequentially from the said store in such manner that the interval of time between two successive outputs of the same word (each of these outputs corresponding to the processing of this word by the central logical control unit) is sufficiently short for this logical unit to be able to process all the information emanating from the terminal equipment with which this word is associated and to effect its controls at a sufficiently high rate for the said terminal equipment to function correctly. Finally in effecting informtion exchanges is effected between a word leaving the store and a word included therein, by storage of the information obtained from the leaving word until the instant when the included word leaves the store.

In addition, this method may be completed by the use of a programme for piloting the central logical unit and by the inclusion, in the information exchanges between words, of a routing of a programme addresse for permitting branching of the said programme on the words concerned.

The invention also concerns the information processing system by which the aforesaid method is applied and which comprises:

- a central logical control unit forming the words from the information supplied by the various terminal equipments,
- a store containing at least as many words as there are terminal equipments,
- a parallel register successively receiving the various words emanating from the said store and reintroducing them into the latter as long as their processing has not been completed,
- one or more buffer registers associated with the parallel register and permitting, under the control of the central logical unit, information exchanges between various words of the store,
- one or more comparator members seeking the identity between certain items of information communicated to the buffer register and the items of information entering the parallel register.

DETAILED DESCRIPTION OF THE PREFERRED EMBODIMENT

The invention will be more readily understood with the aid of an exemplary embodiment relating to an information processing system for an electronic telephone exchange and with the aid of the accompanying single FIGURE, which is a functional diagram of the said system.

The central logical control unit C, which performs the instructions supplied by a programme P, produces 2 m words corresponding to the processing of m two-way connections. These words are introduced through a parallel register R into a sequential access circulating store M. Each word contains more particularly the items of information concerning the location of the equipments of the calling and called subscribers, the dialling pulses emitted by the calling subscriber, the position in the store M of the word reserved for the other direction of communication, one or more delay devices, the address of the last line performed of the programme P and where necessary one or more end-of-sub-routine transfer addresses, and the identification of the periods of time during which the connection of these two correspondents is established in the switching network D.

The 2 $m$ words having $n$ bits are stored in the store M, which consists of a shift registers (for example of the MOS technique) having 2 $m$ positions: The shifting in these registers is controlled by the pulses from a time base circuit B.

At each pulse, the word stored in the order 1 of the tore M is extracted and positioned as a whole in the ıarallel register R; at the next pulse, the word of order is restored in the memory M, the other words being hifted, and it is the word of order 2, which has come nto the position 1, that then enters the parallel register ł. The complete read-out of the store is effected by 2 ı shift pulses distributed regularly by the time base cir-uit B. The very brief period allotted to the logical con-rol unit for the processing of each word located in the ıarallel register R is therefore defined by the time base ircuit B. An order to magnitude of this time will here-nafter be indicated in the course of a numerical exam-ıle.

The content of the word output from the store M and ntroduced into the register R makes available to the ogical control unit C, simultaneously, all the data rela-ive to the one-way connection processed at this pre-ise instant by the logical control unit.

In accordance with these data and the programme P, he logical control unit, piloted by the time based cir-uit B, sends different instructions to the switching net-vork D, as also to the terminal equipments E of the tel-phone circuits involved in the single connection un-lergoing processing at this instant.

The logical unit C can also modify certain data con-ained in the register R, that is to say, it can introduce ıew words or erase the words whose processing has een completed.

However, the time base circuit B produces the shift-ıng at regular intervals of the words stored in the store M. The data relative to the word undergoing processing which were in the register R are then, at the end of the time defined by the time base circuit B, restored in the store M, accompanied by the last address of the pro-cessed programme P. The logical control unit must therewait for the appearance of a further word to be processed in order to continue the processing of this word, and so on until the completion of this processing.

When all the words stored in the store M have suc-cessively been processed by the logical control unit C, the latter will return to the first word, the information of which will contain the last processed address of the program P for this word, and the logical control unit C will continue to progress through the rest of the pro-gramme P.

The processing of each word is therefore resumed at regular intervals after the processing of the 2 $m$-1 other words, at the stage reached in the previous processing; at the end of the time allocated to the processing of the word under consideration, the processing is interrupted until the next extraction of this word, regardless of the state in which the progressing was interrupted.

As long as the processing of a word has not been completed, the word is reintroduced into the store M by the register R. When its processing has been com-pleted, the word is erased from the store.

The logical control unit C must supervise many con-nections, while on the other hand the change of the state of each subscriber's line (looping, dialling) is very slow having regard to the speed of the logical control unit C.

Moreover, in time division multiplex systems, an in-terval of time is sequentially allotted to each connec-tion in order to find a route in the switching network. This interval of time may fall into correlation with the time taken by the logical control unit to process the same connection, whereby the control of the switching network is considerably simplified.

In order that the items of information may be trans-mitted from one processing word of a subscriber to the word of another subscriber (two-way connection) or the words of a number of subscribers (conference), one or more buffer register T are necessary.

Such registers T receive certain data from the word undergoing processing in the register R and retain them until the instant when the word of the correspondent is in turn processed in the register R. More particularly, a register T contains all the recognition data necessary for tracing the word of the correspondent.

The recognition of this word is effected by compari-son between these recognition data and certain items of information contained in the word of the correspon-dent at the instant of its processing in R. When the rec-ognition comparator A allocated to each buffer register T finds equality between certain data contained in the registers T and R, this comparator A gives an order to the logical control unit C which authorises the ex-changes of information between the registers R and T. A programme address contained in T enables the logi-cal unit C to find in the programme P the set of instruc-tions concerning these exchanges of information.

For example, in one particular case of application 128 two-way connections ($m = 128$) can be processed, and the 256 ($2m$) processing words required are stored in the store M.

The shift registers of the store M have 256 positions and the complete exploration of this store is obtained by 256 shift pulses distributed over 2 milliseconds. The time allotted to the processing of each word stored in the parallel register R is therefore in the neighbour-hood of 8 microseconds.

In the described case of application, the period of 2 milliseconds is a multiple of the time of 125 microsec-onds at present adopted in telephone exchanges whose switching network operates by time division multiplex for separating two items of information concerning the same connection.

For reasons of safety, two or more logical control units can operate alternately, thus making it possible to process, for example, 2 × 128 = 256 two-way connec-tions.

In this case, the information exchanges between these logical units takes place through their buffer reg-isters.

In the case of a breakdown of one logical control unit, the other one above can still deal with one-half of the traffic.

The logical control unit can be independent and need not be controlled by the programme P in the particular case of a telephone exchange having entirely wired logic.

Complementary shift registers may be added to the store M in order to enable one or more time delays to be effected. Each time delay is obtained with the aid of a counter pre-set by the corresponding complementary bits at the extraction of a particular word. The content of the counter is then incremented by one unit and re-stored in the store at the same time as the word.

Therefore, starting with a zero initial content of the counter, it is possible to define a time delay by compar-ison of the content of this counter with a reference code with characterises this time delay. A time delay is thus obtained for each word with a single counter.

Other complementary shift registers may also be added to the store M to permit the recording of the dialling pulses emitted by a calling subscriber. The dialling pulses of the latter are recorded, in the processing of the word allocated to this calling subscriber, by a counter attached to the register R, of which the successive positions peculiar to this word will follow this word when it circulates through the store M. This counter will therefore be available for processing the dialling pulses which may occur in the other words.

The invention is applicable to all information transmission systems and more particularly to electronic telephone exchanges.

I claim:

1. A method for transferring a portion of a first data word into a second data word said data words provided from information transmission terminals and processed in a central logic control unit, each of said words containing all the information relative to a given terminal, said words being stored in a sequentially accessed circulating memory and sequentially extracted from said memory for temporary storage in a first register during processing so that the interval of time between two successive extractions of the same word is less than the time required for modifying the word through a signalling line of the terminal equipment, said method comprising the steps of:

transferring the first word temporarily stored in said first register into a second register connected in parallel with said first register, storing the second word leaving the circulating memory in said first register, comparing portions of said first and second data words contained in the first and second registers, transferring a part of the first word into the second word thereby forming a modified second word, the transfer operation occurring after the detection of the second word in the comparing step, and reinserting said modified second word into said circulating memory.

2. A system for cyclically storing and processing information provided from information transmission terminal equipment, said sytem having a sequentially accessed circulating memory for registering words associated with terminal equipment and a parallel register connected to successively receive words from said memory, said parallel register connected to a logical control unit and said parallel register reintroducing words into the memory and inserting new words into the memory from said logic control unit, wherein the improvement of said system comprises:

a buffer register connected in parallel with said parallel register for storing words from said logic control unit and said parallel register, and means for comparing portions of a word within said buffer register and portions of a word leaving said parallel register and for providing signals to said logic control unit when said portions are identical, said signals enabling said logic control unit to exchange information between said first and second words.

* * * * *

UNITED STATES PATENT OFFICE
CERTIFICATE OF CORRECTION

Patent No. 3,903,509 Dated September 2, 1975

Inventor(s) JEAN PICANDET

It is certified that error appears in the above-identified patent and that said Letters Patent are hereby corrected as shown below:

IN THE SPECIFICATION:

Col. 2, line 6, "informtion" should read -- information --.

Col. 3, line 37, "therewait" should read -- therefore wait --.

Col. 4, line 51, "above" should read -- alone --;
line 67, "with" should read -- which --.

Signed and Sealed this

*twenty-seventh* Day of *January 1976*

[SEAL]

*Attest:*

RUTH C. MASON
*Attesting Officer*

C. MARSHALL DANN
*Commissioner of Patents and Trademarks*